(12) United States Patent　(10) Patent No.:　US 7,768,884 B2
Sakamoto　(45) Date of Patent:　Aug. 3, 2010

(54) DROPOUT DETECTION DEVICE, DISK REPRODUCTION APPARATUS, AND DROPOUT DETECTION METHOD

(75) Inventor: Hideki Sakamoto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 371 days.

(21) Appl. No.: 12/048,950

(22) Filed: Mar. 14, 2008

(65) Prior Publication Data

US 2008/0285412 A1　Nov. 20, 2008

(30) Foreign Application Priority Data

May 17, 2007　(JP)　............................. 2007-131419

(51) Int. Cl.
*G11B 7/00*　(2006.01)
(52) U.S. Cl. ................................. 369/47.18; 369/53.32
(58) Field of Classification Search ............. 369/47.14, 369/47.17, 47.18, 47.25, 47.44, 53.32, 53.33, 369/53.34, 53.35
See application file for complete search history.

(56) References Cited

U.S. PATENT DOCUMENTS 6,888,782 B2 * 5/2005 Tateishi et al. ........... 369/47.18

7,023,782 B2　4/2006 Abe et al.

FOREIGN PATENT DOCUMENTS

JP　02002216345　*　8/2002　................ 369/44.1
JP　2003-132533　　5/2003

* cited by examiner

*Primary Examiner*—Nabil Z Hindi
(74) *Attorney, Agent, or Firm*—Brinks Hofer Gilson & Lione

(57) ABSTRACT

A dropout detection device, a disk reproduction apparatus, and a dropout detection method for detecting the occurrence of a dropout are provided. A low-pass filter outputs, as a signal LFENV, a low-frequency component of an envelope signal ENV generated by an envelope generation circuit, which represents an upper envelope of a first RF signal RF1 input from an RF amplifier unit. An adder adds a shift amount SH to the envelope signal ENV, and outputs a resultant signal as a shifted envelope signal SENV. A comparator outputs a dropout detection signal DET during a time period PT in which the signal LFENV is larger than the shifted envelope signal SENV. A detection control unit detects an amplitude ARF1 of the first RF signal RF1, and changes a frequency gain characteristic of the low-pass filter and the shift amount SH according to the magnitude of the detected amplitude AR1.

20 Claims, 7 Drawing Sheets a b c d e

DROPOUT DETECTION DEVICE, DISK REPRODUCTION APPARATUS, AND DROPOUT DETECTION METHOD

RELATED APPLICATION

The present application claims priority to Japanese Patent Application Number 2007-131419, filed May 17, 2007, the entirety of which is hereby incorporated by reference.

BACKGROUND OF THE INVENTION

1. Field of the Invention

The present invention relates to a technique of detecting a dropout in a disk drive which reproduces data recorded on a recording disk.

2. Description of the Related Art

As a technique of detecting a dropout, i.e., a phenomenon in which a signal cannot be favorably read due to such factors as damage on a recording disk, in a disk drive which reproduces data recorded on the recording disk, there is known a technique of detecting the occurrence of the dropout on the basis of an envelope of an RF (Radio Frequency) signal read from an optical disk by a pickup (e.g., Japanese Unexamined Patent Application Publication No. 2003-132533). According to the technique, when the envelope of the RF signal rapidly decreases by a predetermined level or more, a dropout detection signal indicating the occurrence of the dropout is output during the decrease of the envelope.

According to the technique described in this publication, a change in the amplitude magnitude of the envelope of the RF signal causes a change in the timing and the duration of the output of the dropout detection signal indicating the occurrence of the dropout. As a result, a process in response to the occurrence of the dropout cannot be performed with a similar characteristic. The amplitude of the envelope refers to the difference between the magnitude of the envelope immediately before and immediately after the occurrence of the dropout and the magnitude of the envelope during the occurrence of the dropout.

SUMMARY OF THE INVENTION

In view of the above, an object of the present invention is to output a dropout detection signal indicating the occurrence of a dropout for the same time period for dropouts of the same time length, irrespective of the amplitude magnitude of an envelope of an RF signal.

To achieve the above object, a dropout detection device according to one embodiment of the invention detects the occurrence of a dropout, which is the absence of a recording signal component, occurring in an RF signal read from a disk constituting a recording medium, and includes an envelope signal generation unit, a dropout signal generation unit, an amplitude detection unit, and a criterion adjustment unit. The envelope signal generation unit generates an envelope signal representing an envelope of the RF signal. In accordance with a criterion specifying a state of the envelope signal in which the dropout is assumed to occur, the dropout signal generation unit detects the occurrence of the dropout from the state of the envelope signal generated by the envelope signal generation unit. Further, during the detection of the occurrence of the dropout, the dropout signal generation unit outputs a dropout detection signal indicating the occurrence of the dropout. The amplitude detection unit detects the magnitude of the amplitude of the RF signal. The criterion adjustment unit sets the criterion in the dropout signal generation unit. Further, in accordance with the magnitude of the amplitude detected by the amplitude detection unit, the criterion adjustment unit changes the criterion set in the dropout signal generation unit such that the dropout detection signal is output for the same time period for dropouts of the same time period irrespective of the amplitude of the RF signal.

According to the thus configured dropout detection device, the criterion specifying the state of the envelope signal in which the dropout is assumed to occur is changed in accordance with the amplitude of the RF signal. Accordingly, the dropout signal can be output for the same time period for dropouts of the same time period irrespective of the amplitude of the RF signal.

More specifically, the above-described dropout detection device may be configured such that the criterion adjustment unit changes the criterion such that the criterion specifies a smaller value for a smaller magnitude of the amplitude detected by the amplitude detection unit, and that the dropout signal generation unit outputs the dropout detection signal during a time period in which the magnitude of the envelope signal is smaller than a threshold value equal to the median value of the amplitude of the envelope signal added with a value specified by the criterion, Alternatively, the above-described dropout detection device may be configured such that the criterion adjustment unit changes the criterion such that the criterion specifies a smaller value for a smaller magnitude of the amplitude detected by the amplitude detection unit, and that the dropout signal generation unit outputs the dropout detection signal during a time period in which the magnitude of a low-frequency component of the envelope signal is larger than the magnitude of a signal equal to the envelope signal added with a value specified by the criterion.

Further, the above-described dropout detection device may be configured such that the dropout signal generation unit includes a low-pass filter and a comparator. The low-pass filter may extract a low-frequency component of the envelope signal. The comparator may compare the magnitude of a signal equal to the envelope signal added with a predetermined value with the magnitude of the low-frequency component extracted by the low-pass filter, and may output the dropout detection signal during a time period in which the magnitude of the low-frequency component is larger than the magnitude of the signal equal to the envelope signal added with the predetermined value. Furthermore, the above-described dropout detection device may be configured such that the criterion specifies a frequency gain characteristic of the low-pass filter, and that the criterion adjustment unit changes the criterion such that a cut-off frequency of the low-pass filter in the frequency gain characteristic specified by the criterion increases as the magnitude of the amplitude detected by the amplitude detection unit decreases. In this case, the dropout detection device may be further configured such that the criterion specifies the magnitude of the predetermined value as well as the frequency gain characteristic of the low-pass filter, and that the criterion adjustment unit changes the criterion such that the magnitude of the predetermined value specified by the criterion decreases as the magnitude of the amplitude detected by the amplitude detection unit decreases.

The above-described dropout detection device can be employed to detect the dropout in a disk reproduction apparatus for an optical disk, for example. For steadier detection of the dropout, it is preferable that the disk reproduction apparatus employing the above-described dropout detection device is provided with an amplifier circuit for amplifying, to a predetermined level, the RF signal including a direct current component and read by a pickup which reads the RF signal from the disk of the disk reproduction apparatus, and that the envelope signal generation unit generates an envelope signal representing an envelope of the RF signal amplified by the amplifier circuit.

As described above, according to the above aspect of the present invention, the dropout detection signal indicating the occurrence of the dropout can be output for the same time period for dropouts of the same time length, irrespective of the amplitude magnitude of the envelope of the RF signal.

DESCRIPTION OF THE PREFERRED EMBODIMENT

An embodiment of the present invention will be described below, with the application of the present invention to an optical disk drive taken as an example.

Figure 1:
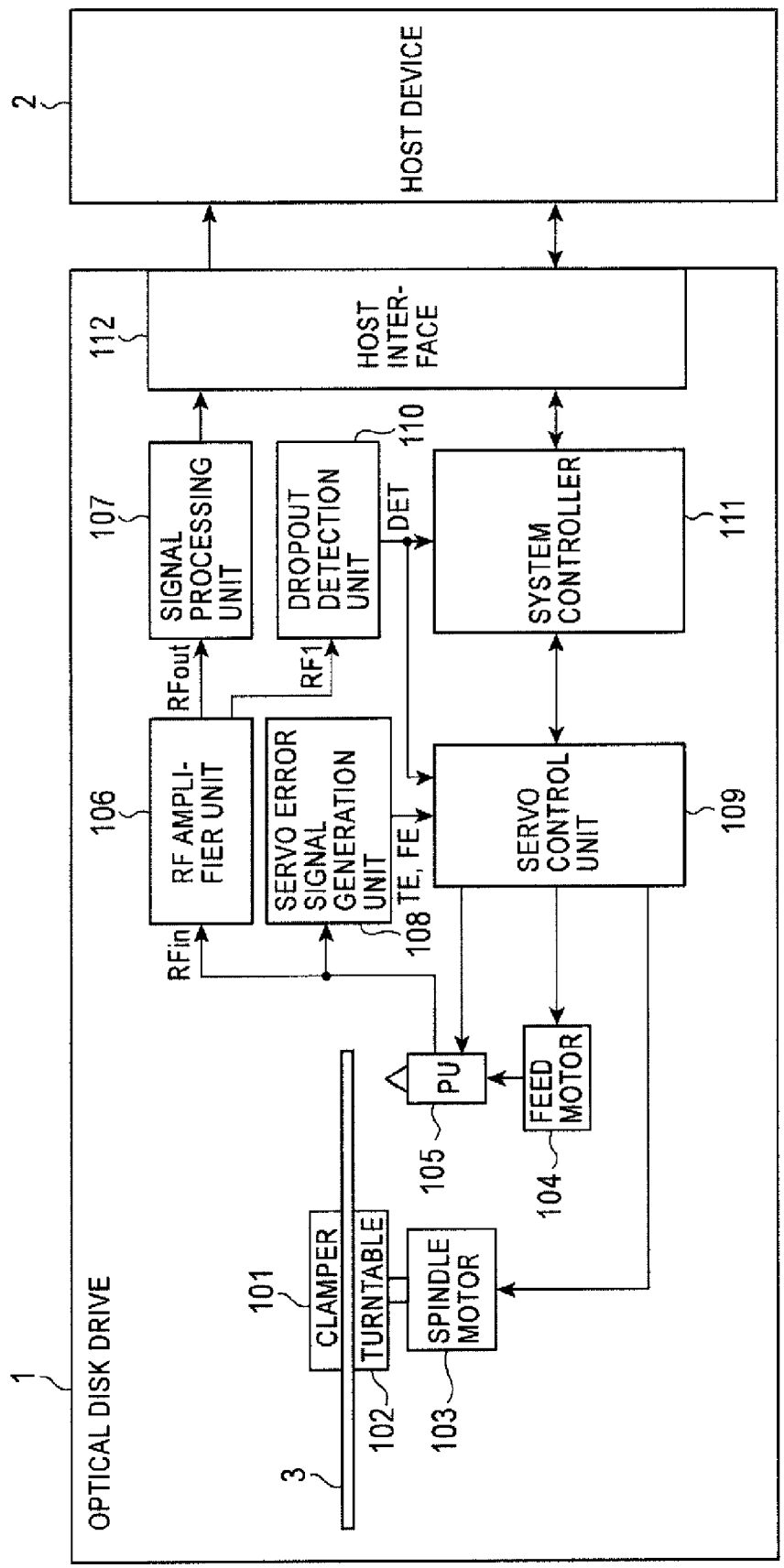
FIG. 1 is a block diagram illustrating a configuration of an optical disk drive according to an embodiment of the present invention.

FIG. 1 illustrates a configuration of the optical disk drive according to the present embodiment. As illustrated in the drawing, the optical disk drive 1 includes a damper 101, a turntable 102, a spindle motor 103, a feed motor 104, a pickup 105, an RF amplifier unit 106, a signal processing unit 107, a servo error signal generation unit 108, a servo control unit 109, a dropout detection unit 110, a system controller 111, and a host interface 112 connected to a host device 2.

In the above-described configuration, the damper 101 and the turntable 102 clamp an optical disk 3, such as a CD (Compact Disk) or a DVD (Digital Versatile Disk), installed on the optical disk drive 1. The spindle motor 103 rotates the optical disk 3 clamped between the turntable 102 and the damper 101. Further, the feed motor 104 performs a seek operation of moving the pickup 105 in the radial direction of the optical disk 3.

The pickup 105 includes a laser light source, a photoelectric element, an objective lens, a focus actuator, and a tracking actuator. The objective lens collects light radiated from the laser light source, and guides reflected light reflected by a signal recording surface of the optical disk 3 to the photoelectric element. The focus actuator adjusts the focal position by moving the objective lens in a direction perpendicular to the signal recording surface of the optical disk 3. The tracking actuator performs tracking adjustment by moving the objective lens in the radial direction of the optical disk 3. The pickup 105 outputs a signal obtained by photoelectric conversion on the reflected light reflected by the signal recording surface of the optical disk 3 and detected by the photoelectric element.

Then, the RF amplifier unit 106 receives the signal output from the pickup 105 as an input RF signal RFin, and outputs to the dropout detection unit 110 a first RF signal RF1, which is obtained by amplifying the input RF signal RFin including a direct current component thereof. The RF amplifier unit 106 also amplifies an alternating current component of the input RF signal RFin, and outputs the amplified signal to the signal processing unit 107 as an output RF signal RFout.

From the signal output from the pickup 105, the servo error signal generation unit 108 generates, for example, a focus error signal (FE) necessary for a focus servo and a tracking error signal (TE) necessary for a tracking servo.

The signal processing unit 107 performs the demodulation of data transmitted by the output RF signal RFout output from the RF amplifier unit 106, and the detection and the correction of an error occurring in the demodulated data by using an EDC (Error-Detecting Code) and an ECC (Error-Correcting Code) included in the demodulated data. Thereby, the signal processing unit 107 reproduces data recorded on the optical disk 3, and transmits the reproduced data to the host interface 112.

The dropout detection unit 110 detects the level of an envelope of the first RF signal RF1 output from the RF amplifier unit 106. In accordance with the detected level of the envelope, the dropout detection unit 110 detects the occurrence of a dropout, i.e., the absence of a recording signal component in the RF signal, occurring in the pickup 105 due to such factors as damage on the optical disk 3, and notifies the system controller 111 and the servo control unit 109 of the occurrence of the dropout through a dropout detection signal DET.

The servo control unit 109 controls the seek operation of the feed motor 104 in accordance with the control by the system controller 111, and performs a variety of servo controls in accordance with the focus error signal (FE) and the tracking error signal (TE). For example, the servo control unit 109 performs a control of the laser light source, a focus servo control, and a tracking servo control by sending instructions to the pickup 105 and the feed motor 104, and servocontrols the rotation rate of the spindle motor 103 by sending an instruction to the spindle motor 103. Further, during the notification of the detection of the dropout by the dropout detection signal DET, the servo control unit 109 also performs, for example, an operation of maintaining the characteristic of the servocontrols as the characteristic prior to the notification of the detection of the dropout.

The system controller 111 controls the respective units described above. Further, in accordance with a host command received from the host device 2 through the host interface 112, the system controller 111 performs, for example, a reading process of reproducing from the optical disk 3 data requested by the host command and transmitting the reproduced data to the host device 2 through the host interface 112. Furthermore, upon notification of the detection of the dropout by the dropout detection signal DET, the system controller 111 performs a predetermined dropout error handling process. The dropout error handling process includes, for example, a process of skipping a plurality of tracks from the tracks to be read.

Figure 2:
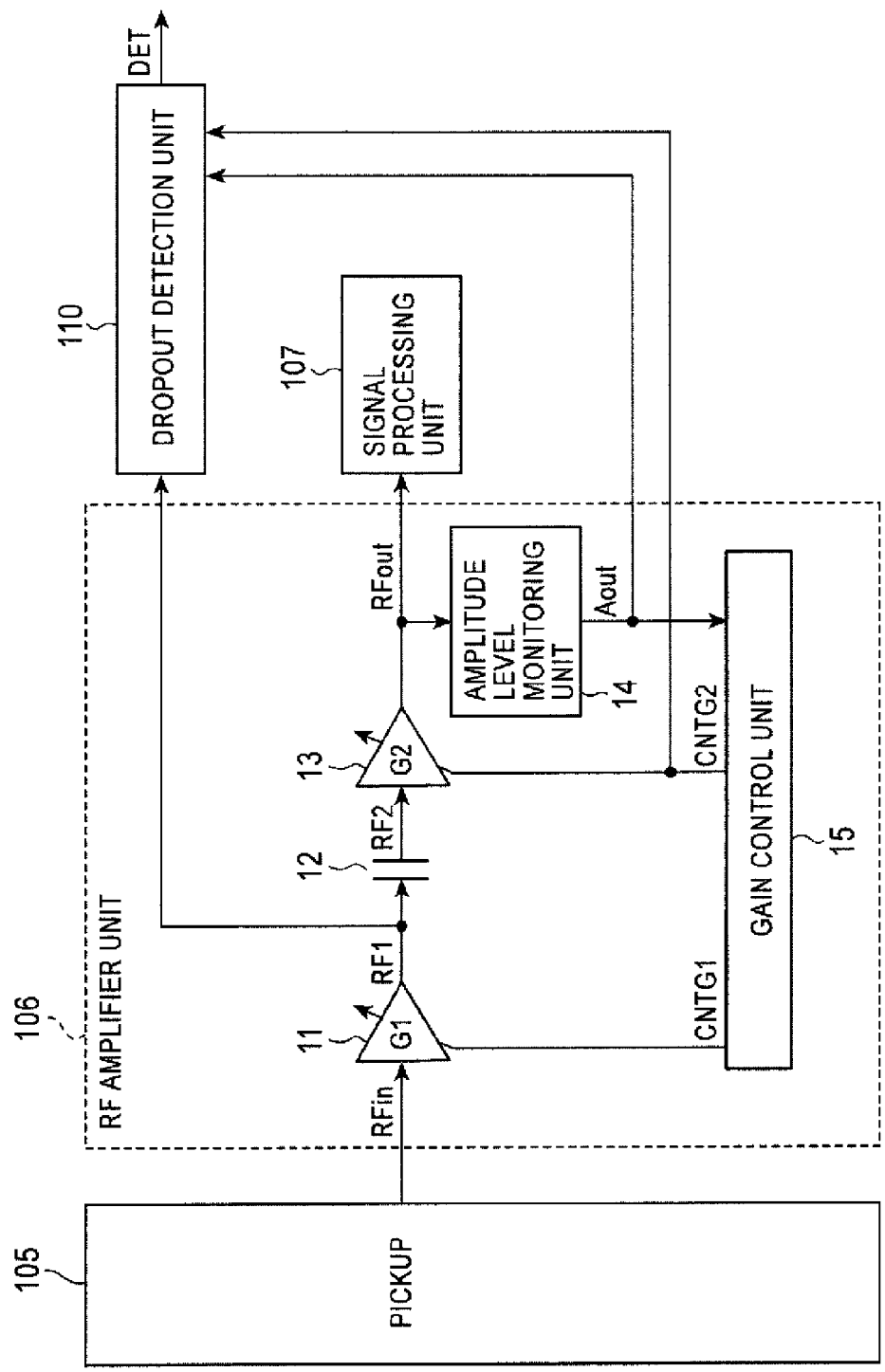
FIG. 2 is a block diagram illustrating a configuration of an RF amplifier unit according to the embodiment of the present invention.

FIG. 2 illustrates a configuration of the RF amplifier unit 106. As illustrated in the drawing, the RF amplifier unit 106 includes a first gain variable amplifier 11, a capacitor 12 for cutting a direct current component, a second gain variable amplifier 13, an amplitude level monitoring unit 14, and a gain control unit 15.

The first gain variable amplifier 11 amplifies the input RF signal RFin input from the pickup 105 to generate the first RF signal RF1, and outputs the first RF signal RF1 to the dropout detection unit 110. Further, the capacitor 12 extracts an alternating current component of the first RF signal RF1 to generate a second RF signal RF2. Then, the second gain variable amplifier 13 amplifies the second RF signal RF2, and outputs the amplified signal to the signal processing unit 107 as the output RF signal RFout. If the pickup 105 performs the photoelectric conversion on the reflected light for each area by using a quarter-split photodiode, for example, an adder unit for adding up signals output by the pickup 105 for respective areas is provided so that a signal obtained by the addition performed by the adder unit is used as the input RF signal RFin.

Then, the amplitude level monitoring unit 14 detects an amplitude Aout of the output RF signal RFout, and notifies the dropout detection unit 110 and the gain control unit 15 of the amplitude Aout.

At the start of a reproduction operation of the optical disk 3, for example, on the basis of the amplitude Aout of the output RF signal RFout provided by the amplitude level monitoring unit 14, the gain control unit 15 controls a gain G1 of the first gain variable amplifier 11 and a gain G2 of the second gain variable amplifier 13 by using gain control signals CNTG1 and CNTG2, respectively, such that the amplitude Aout of the output RF signal RFout is at a predetermined output level (e.g., the dynamic range of the second gain variable amplifier 13). Further, the gain control unit 15 notifies the dropout detection unit 110 of the gain control signal CNTG2 for the gain G2 of the second gain variable amplifier 13.

In the above, the gain control unit 15 controls the gain G1 of the first gain variable amplifier 11 and the gain G2 of the second gain variable amplifier 13 as follows, for example. That is, the gain control unit 15 determines the gain G1 such that the value G1×Ain/K is a predetermined value (e.g., the maximum output value of the first gain variable amplifier 11), wherein Ain refers to the amplitude of the input RF signal RFin calculated from the amplitude Aout of the output RF signal RFout, a current value of the gain G1 of the first gain variable amplifier 11, and a current value of the gain G2 of the second gain variable amplifier 13. Further, using the thus determined gain G1 of the first gain variable amplifier 11, the gain control unit 15 determines the gain G2 of the second gain variable amplifier 13 such that the amplitude Aout of the output RF signal RFout is at a predetermined output level (e.g., the dynamic range of the second gain variable amplifier 13).

Here, K represents a constant. In a combination of a high reflectance and a low reflectance representing a recording signal on the optical disk 3, the ratio of the reflectance difference between the high reflectance and the low reflectance to the reflectance of the high reflectance, i.e., the ratio of the amplitude Ain of the input RF signal RFin to a level Ein of an upper envelope of the input RF signal RFin, is determined by a standard. The constant K is the minimum value of the ratio. If the optical disk 3 is a CD-R (Compact Disk-Recordable), the ratio and the minimum value of the ratio is determined to be 0.6. Thus, the constant K is 0.6.

Figure 3:
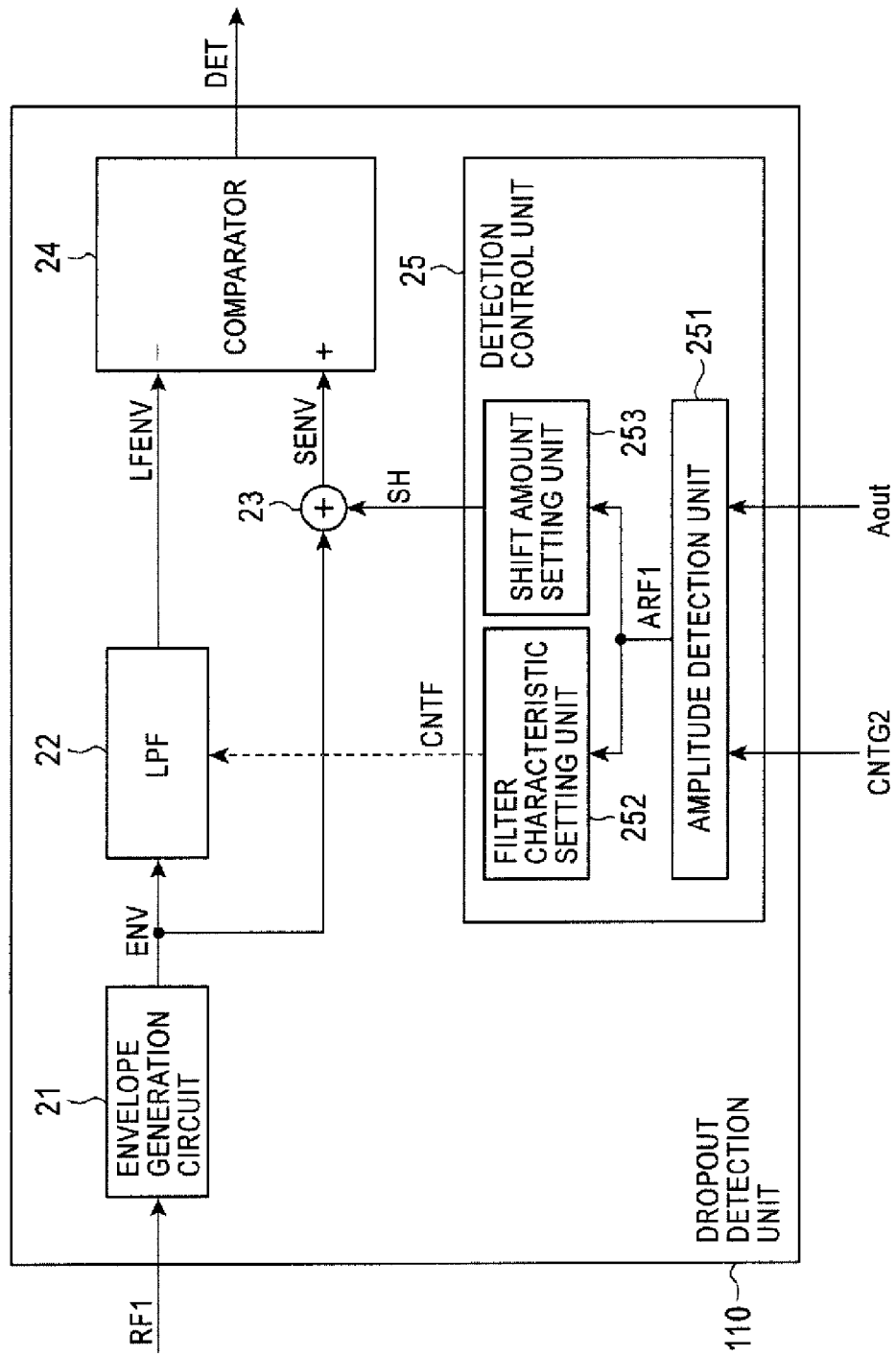
FIG. 3 is a block diagram illustrating a configuration of a dropout detection unit according to the embodiment of the present invention.

FIG. 3 illustrates a configuration of the dropout detection unit 10. As illustrated in the drawing, the dropout detection unit 110 includes an envelope generation circuit 21, a low-pass filter 22 (LPF 22), an adder 23, a comparator 24, and a detection control unit 25. Further, the detection control unit 25 includes an amplitude detection unit 251, a filter characteristic setting unit 252, and a shift amount setting unit 253.

Figure 4:
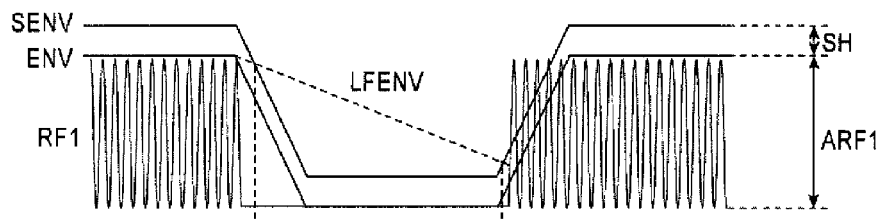
FIG. 4 is a diagram illustrating the operation of the dropout detection unit according to the embodiment of the present invention.
Figure 4:
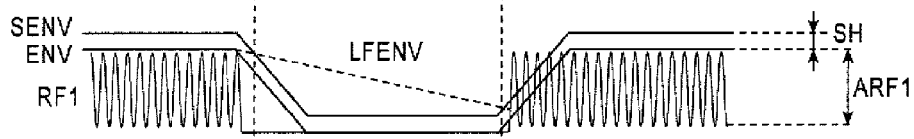
Figure 4:
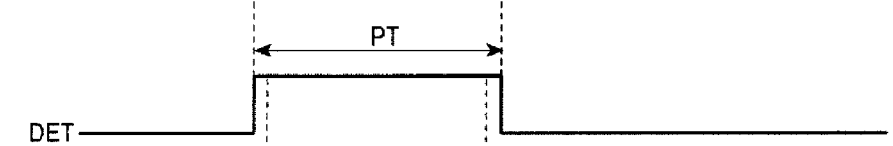
Figure 4:
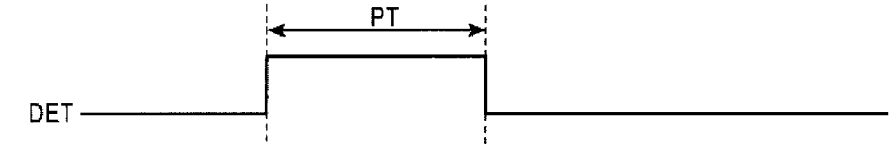
Figure 4:
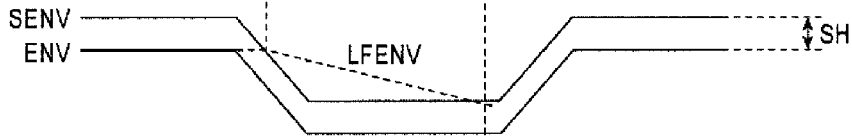

In the above-described configuration, the envelope generation circuit 21 generates an envelope signal ENV representing an upper envelope of the first RF signal RF1 input from the RF amplifier unit 106, as illustrated in a of FIG. 4. The low-pass filter 22 extracts a low-frequency component of the envelope signal ENV with a frequency gain characteristic determined by a cut-off frequency and a time constant set by the detection control unit 25, and outputs the extracted low-frequency component as a signal LFENV. Meanwhile, the adder 23 adds a shift amount SH output from the detection control unit 25 to the envelope signal ENV, and outputs a resultant signal as a shifted envelope signal SENV. Then, the comparator 24 compares the signal LFENV output from the low-pass filter 22 with the shifted envelope signal SENV, and outputs the dropout detection signal DET during a time period PT in which the signal LFENV is larger than the shifted envelope signal SENV, as illustrated in c of FIG. 4. As described above, in the dropout detection unit 110, the first RF signal RF1 obtained by amplifying the input RF signal RFin including the direct current component thereof is used to detect the dropout, instead of the output RF signal RFout obtained by extracting and amplifying the alternating current component of the input RF signal RFin input from the pickup 105. This is because the frequency characteristic of the signal is changed in the extraction of the alternating current component in the output RF signal RFout, and thus the dropout detection signal cannot be reliably detected from the output RF signal RFout.

Meanwhile, in the detection control unit 25, the amplitude detection unit 251 detects an amplitude ARF1 of the first RF signal RF1 from the equation ARF1=Aout/G2 using the amplitude Aout of the output RF signal RFout and the gain G2 of the second gain variable amplifier 13 provided by the RF amplifier unit 106. Then, the filter characteristic setting unit 252 sets the frequency gain characteristic of the low-pass filter 22 to the frequency gain characteristic according to the magnitude of the amplitude ARF1 of the first RF signal RF1. Further, the shift amount setting unit 253 outputs the shift amount SH according to the magnitude of the amplitude ARF1 of the first RF signal RF1.

In the above, the relationship between the magnitude of the amplitude ARF1 of the first RF signal RF1 and the frequency gain characteristic set in the low-pass filter 22 by the filter characteristic setting unit 252 and the relationship between the magnitude of the amplitude ARF1 of the first RF signal RF1 and the shift amount SH output by the shift amount setting unit 253 are previously obtained by experiment or calculation and set such that the dropout detection signal DET is output at the same timing for the same time period PT for similar dropouts occurring in the first RF signal RF1, irrespective of the amplitude ARF1 of the first RF signal RF1.

For example, this is illustrated in the first RF signal RF1 of a of FIG. 4 and the first RF signal RF1 of b of FIG. 4, which are different in the amplitude ARF1. The relationship between the magnitude of the amplitude ARF1 of the first RF signal RF1 and the shift amount SH output by the shift amount setting unit 253 is determined such that the shift amount SH decreases as the amplitude ARF1 of the first RF signal RF1 decreases. Further, the relationship between the magnitude of the amplitude ARF1 of the first RF signal RF1 and the frequency gain characteristic set in the low-pass filter 22 by the filter characteristic setting unit 252 is determined such that the signal LFENV changes at a similar rate with respect to the change of the envelope signal ENV irrespective of the amplitude of the envelope signal ENV. More specifically, for example, the relationship between the magnitude of the amplitude ARF1 of the first RF signal RF1 and the frequency gain characteristic set in the low-pass filter 22 by the filter characteristic setting unit 252 is determined such that the cut-off frequency increases as the amplitude ARF1 of the first RF signal RF1 decreases.

With the above-described configuration, as illustrated in c of FIG. 4, the dropout detection signal DET can be output at the same timing for the same time period PT for the first RF signal RF1 of a of FIG. 4 and the first RF signal RF1 of b of FIG. 4, in which the dropout occurs at the same timing for the same time period but which are different in the amplitude ARF1.

As illustrated in the first RF signal RF1 of a of FIG. 4 and the first RF signal RF1 of e of FIG. 4, which are different in the amplitude ARF1, if the frequency gain characteristic of the low-pass filter 22 and the shift amount SH are fixed, the dropout detection signal DET is output at different timings for different time periods PTs for the first RF signal RF1 of a of FIG. 4 and the first RF signal RF1 of e of FIG. 4, in which the dropout occurs at the same timing for the same time period but which are different in the amplitude ARF1, as illustrated in c and d of FIG. 4.

As described above, according to the present embodiment, the criterion for the detection of the dropout is changed in accordance with the amplitude of the RF signal. Accordingly, the dropout detection signal can be output at the same timing for the same time period for RF signals in which the dropout occurs at the same timing for the same time period but which are different in amplitude.

The technique of the present embodiment, i.e., the technique of changing the criterion for the detection of the dropout in accordance with the amplitude of the RF signal to thereby output the dropout detection signal at the same timing for the same time period for RF signals in which the dropout occurs at the same timing for the same time period but which are different in amplitude, can be similarly applied to a configuration employing the dropout detection unit 110 of a different configuration from the configuration illustrated in FIG. 3.

Figure 5:
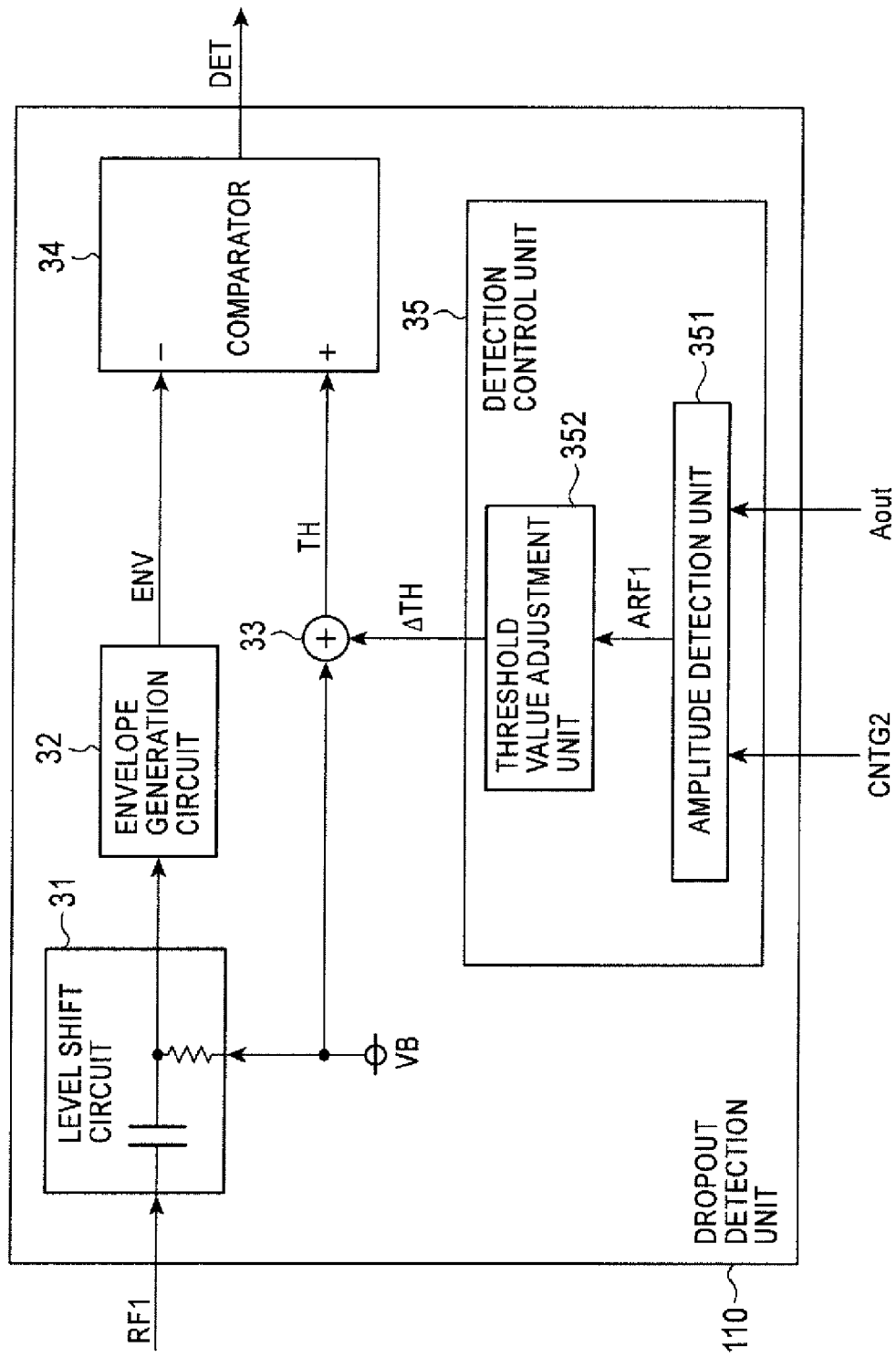
FIG. 5 is a block diagram illustrating an alternative configuration of the dropout detection unit according to the embodiment of the present invention.

That is, the dropout detection unit 110 may be configured as illustrated in FIG. 5, for example. As illustrated in the drawing, the dropout detection unit 110 includes a level shift circuit 31, a second envelope generation circuit 32, a second adder 33, a second comparator 34, and a second detection control unit 35. Further, the second detection control unit 35 includes a second amplitude detection unit 351 and a threshold value adjustment unit 352.

Figure 6:
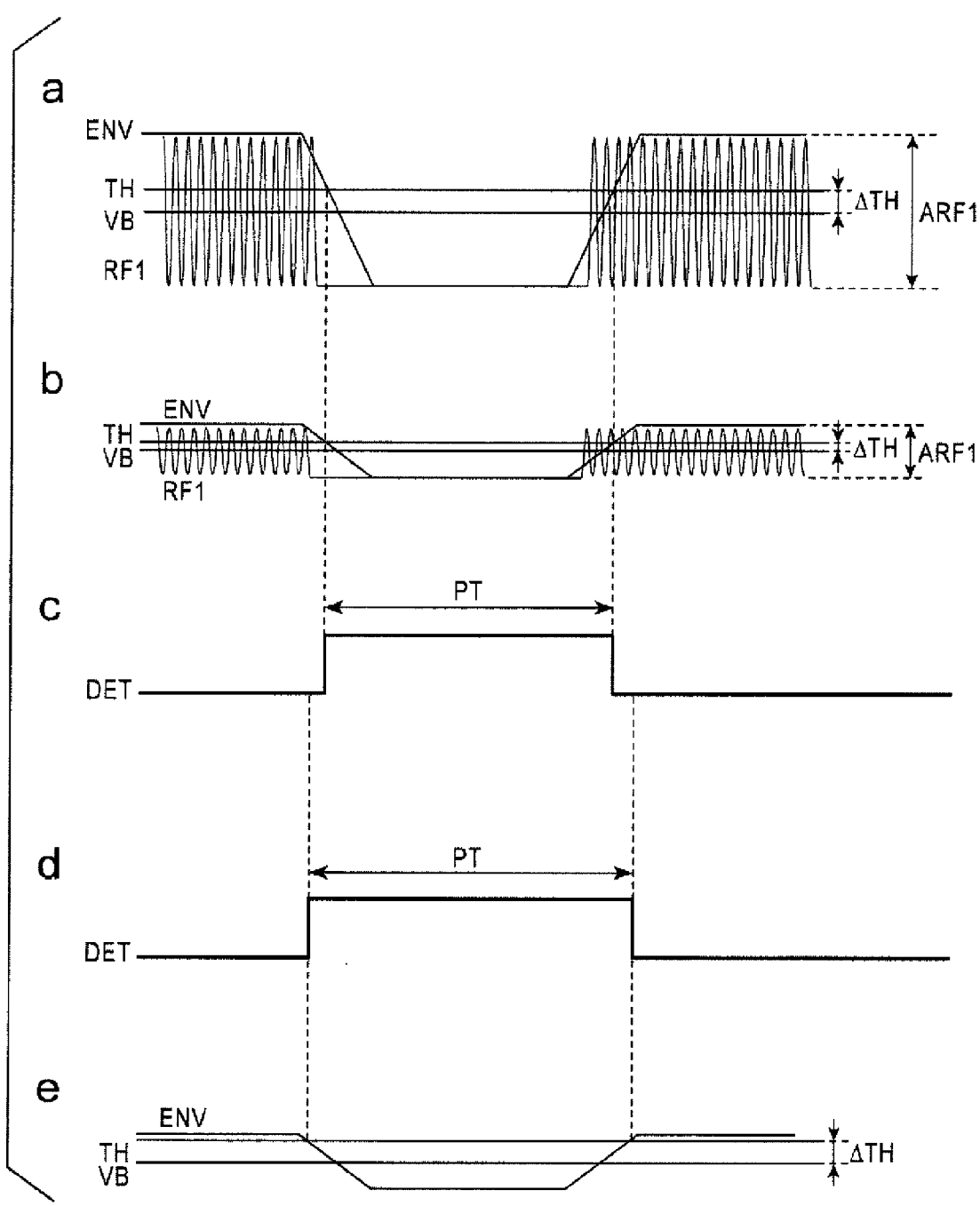
FIG. 6 is a diagram illustrating the operation of the dropout detection unit of the alternative configuration of the dropout detection unit according to the embodiment of the present invention.

In the above-described configuration, the level shift circuit 31 shifts the level of the first RF signal RF1 input from the RF amplifier unit 106 such that the center of the amplitude of the first RF signal RF1 corresponds to a reference voltage VB, as illustrated in a of FIG. 6. Then, the second envelope generation circuit 32 generates an envelope signal ENV representing an upper envelope of the first RF signal RF1, the level of which has been shifted by the level shift circuit 31. Meanwhile, the second adder 33 adds a threshold value adjusting amount ΔTh output from the second detection control unit 35 to the reference voltage VB, and outputs a resultant signal as a threshold value signal TH. Then, the second comparator 34 compares the envelope signal ENV with the threshold value signal TH, and outputs the dropout detection signal DET during a time period PT in which the threshold value signal TH is larger than the envelope signal ENV, as illustrated in c of FIG. 6.

Meanwhile, in the second detection control unit 35, the second amplitude detection unit 351 detects the amplitude ARF1 of the first RF signal RF1 from the equation ARF1=Aout/G2 using the amplitude Aout of the output RF signal RFout and the gain G2 of the second gain variable amplifier 13 provided by the RF amplifier unit 106. Then, the threshold value adjustment unit 352 outputs the threshold value adjusting amount ΔTh according to the magnitude of the amplitude ARF1 of the first RF signal RF1.

In the above, the relationship between the threshold value adjusting amount ΔTh output by the threshold value adjustment unit 352 and the magnitude of the amplitude ARF1 of the first RF signal RF1 is previously obtained by experiment or calculation and set such that the dropout detection signal DET is output at the same timing for the same time period PT for the same dropouts occurring in the first RF signal RF1, irrespective of the amplitude ARF1 of the first RF signal RF1.

For example, this is illustrated in the first RF signal RF1 of a of FIG. 6 and the first RF signal RF1 of b of FIG. 6, which are different in the amplitude ARF1. The relationship between the threshold value adjusting amount ΔTh output by the threshold value adjustment unit 352 and the magnitude of the amplitude ARF1 of the first RF signal RF1 is previously determined such that the threshold value adjusting amount ΔTh decreases as the amplitude ARF1 of the first RF signal RF1 decreases. By so doing, the dropout detection signal DET can be output at the same timing for the same time period PT for the first RF signal RF1 of a of FIG. 6 and the first RF signal RF1 of b of FIG. 6, in which the dropout occurs at the same timing for the same time period but which are different in the amplitude ARF1, as illustrated in c of FIG. 6.

If the threshold value adjusting amount ΔTh output by the threshold value adjustment unit 352 is fixed, the dropout detection signal DET is output at different timings for different time periods PTs for the first RF signal RF1 of a of FIG. 6 and the first RF signal RF1 of e of FIG. 6, in which the dropout occurs at the same timing for the same time period but which are different in the amplitude ARF1, as illustrated in c and d of FIG. 6.

Figure 7:
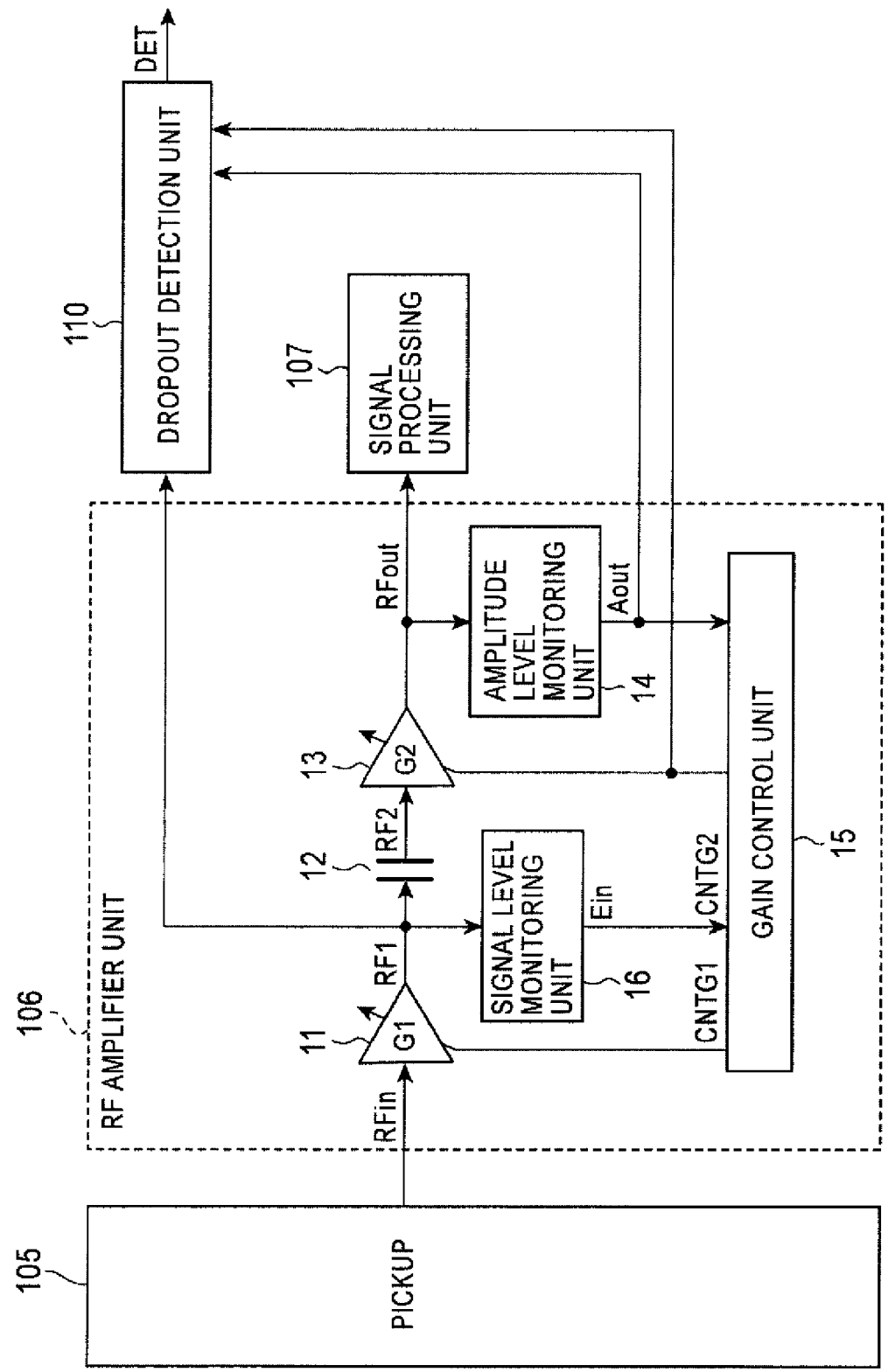
FIG. 7 is a block diagram illustrating another configuration of the RF amplifier unit according to the embodiment of the present invention.

The RF amplifier unit 106 according to the present embodiment can also be configured as illustrated in FIG. 7. As illustrated in the drawing, the present embodiment of the RF amplifier unit 106 is configured such that the RF amplifier unit 106 illustrated in FIG. 2 is combined with a signal level monitoring unit 16 for detecting the level Ein of the upper envelope of the first RF signal RF1. Further, the gain control unit 15 determines the gain G1 of the first gain variable amplifier 11 such that the level Ein of the upper envelope of the first RF signal RF1 detected by the signal level monitoring unit 16 is at a predetermined level (e.g., the maximum output value of the first gain variable amplifier 11). Then, on the basis of the amplitude Aout of the output RF signal RFout detected by the amplitude level monitoring unit 14, the gain control unit 15 determines the gain G2 of the second gain variable amplifier 13 such that the amplitude Aout is at a predetermined output level (e.g., the dynamic range of the second gain variable amplifier 13).

With the above-described configuration, even if the minimum value of the ratio of the amplitude Ain of the input RF signal RFin to the level Ein of the upper envelope of the input RF signal RFin is smaller than a standard value, the saturation of the first RF signal RF1 in the first gain variable amplifier 11 can be prevented. As a result, the dropout can be more appropriately detected.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A dropout detection device for detecting the occurrence of a dropout, which is the absence of a recording signal component, occurring in a radio frequency signal read from a disk constituting a recording medium, the dropout detection device comprising:

an envelope signal generation unit for generating an envelope signal representing an envelope of the radio frequency signal;

a dropout signal generation unit for detecting the occurrence of the dropout from the state of the envelope signal generated by the envelope signal generation unit in accordance with a criterion specifying a state of the envelope signal in which the dropout is assumed to occur, and outputting a dropout detection signal indicating the occurrence of the dropout during the detection of the occurrence of the dropout;

an amplitude detection unit for detecting the magnitude of the amplitude of the radio frequency signal; and a criterion adjustment unit for setting the criterion in the dropout signal generation unit, and changing the criterion set in the dropout signal generation unit in accordance with the magnitude of the amplitude detected by the amplitude detection unit such that the dropout detection signal is output for the same time period for dropouts of the same time period irrespective of the amplitude of the radio frequency signal.

2. The dropout detection device according to claim 1,
wherein the criterion adjustment unit changes the criterion such that the criterion specifies a smaller value for a smaller magnitude of the amplitude detected by the amplitude detection unit, and
wherein the dropout signal generation unit outputs the dropout detection signal during a time period in which the magnitude of the envelope signal is smaller than a threshold value equal to the median value of the amplitude of the envelope signal plus a value specified by the criterion.

3. The dropout detection device according to claim 1,
wherein the criterion adjustment unit changes the criterion such that the criterion specifies a smaller value for a smaller magnitude of the amplitude detected by the amplitude detection unit, and
wherein the dropout signal generation unit outputs the dropout detection signal during a time period in which the magnitude of a low-frequency component of the envelope signal is larger than the magnitude of a signal equal to the envelope signal plus a value specified by the criterion.

4. The dropout detection device according to claim 1,
wherein the dropout signal generation unit includes
a low-pass filter for extracting a low-frequency component of the envelope signal, and
a comparator for comparing the magnitude of a signal equal to the envelope signal plus a predetermined value with the magnitude of the low-frequency component extracted by the low-pass filter, and outputting the dropout detection signal during a time period in which the magnitude of the low-frequency component is larger than the magnitude of the signal equal to the envelope signal plus the predetermined value,
wherein the criterion specifies a frequency gain characteristic of the low-pass filter, and
wherein the criterion adjustment unit changes the criterion such that a cut-off frequency of the low-pass filter in the frequency gain characteristic specified by the criterion increases as the magnitude of the amplitude detected by the amplitude detection unit decreases.

5. The dropout detection device according to claim 4,
wherein the criterion specifies the magnitude of the predetermined value as well as the frequency gain characteristic of the low-pass filter, and
wherein the criterion adjustment unit changes the criterion such that the magnitude of the predetermined value specified by the criterion decreases as the magnitude of the amplitude detected by the amplitude detection unit decreases.

6. A disk reproduction apparatus comprising the dropout detection device according to claim 1.

7. A disk reproduction apparatus comprising the dropout detection device according to claim 2.

8. A disk reproduction apparatus comprising the dropout detection device according to claim 3.

9. A disk reproduction apparatus comprising the dropout detection device according to claim 4.

10. A disk reproduction apparatus comprising the dropout detection device according to claim 5.

11. The disk reproduction apparatus according to claim 6, further comprising:
a pickup for reading the radio frequency signal from the disk; and
an amplifier circuit for amplifying, to a predetermined level, the radio frequency signal read by the pickup and including a direct current component,
wherein the envelope signal generation unit generates an envelope signal representing an envelope of the radio frequency signal amplified by the amplifier circuit.

12. The disk reproduction apparatus according to claim 7, further comprising:
a pickup for reading the radio frequency signal from the disk; and
an amplifier circuit for amplifying, to a predetermined level, the radio frequency signal read by the pickup and including a direct current component,
wherein the envelope signal generation unit generates an envelope signal representing an envelope of the radio frequency signal amplified by the amplifier circuit.

13. The disk reproduction apparatus according to claim 8, further comprising:
a pickup for reading the radio frequency signal from the disk; and
an amplifier circuit for amplifying, to a predetermined level, the radio frequency signal read by the pickup and including a direct current component,
wherein the envelope signal generation unit generates an envelope signal representing an envelope of the radio frequency signal amplified by the amplifier circuit.

14. The disk reproduction apparatus according to claim 9, further comprising:
a pickup for reading the radio frequency signal from the disk; and
an amplifier circuit for amplifying, to a predetermined level, the radio frequency signal read by the pickup and including a direct current component, wherein the envelope signal generation unit generates an envelope signal representing an envelope of the radio frequency signal amplified by the amplifier circuit.

15. The disk reproduction apparatus according to claim 10, further comprising:
a pickup for reading the radio frequency signal from the disk; and
an amplifier circuit for amplifying, to a predetermined level, the radio frequency signal read by the pickup and including a direct current component,
wherein the envelope signal generation unit generates an envelope signal representing an envelope of the radio frequency signal amplified by the amplifier circuit.

16. A dropout detection method for detecting the occurrence of a dropout, which is the absence of a recording signal component, occurring in a radio frequency signal read from a disk constituting a recording medium, the dropout detection method comprising:
an envelope signal generation step for generating an envelope signal representing an envelope of the radio frequency signal;
a dropout signal generation step for detecting the occurrence of the dropout from the state of the generated envelope signal in accordance with a criterion specifying a state of the envelope signal in which the dropout is assumed to occur, and outputting a dropout detection signal indicating the occurrence of the dropout during the detection of the occurrence of the dropout;
an amplitude detection step for detecting the magnitude of the amplitude of the radio frequency signal; and
a criterion adjustment step for setting the criterion used in the dropout signal generation step, and changing, in accordance with the magnitude of the amplitude detected by the amplitude detection step, the set criterion such that the dropout detection signal is output for the same time period for dropouts of the same time period irrespective of the amplitude of the radio frequency signal.

17. The dropout detection method according to claim 16, wherein the criterion adjustment step changes the criterion such that the criterion specifies a smaller value for a smaller magnitude of the amplitude detected by the amplitude detection step, and
wherein the dropout signal generation step outputs the dropout detection signal during a time period in which the magnitude of the envelope signal is smaller than a threshold value equal to the median value of the amplitude of the envelope signal plus a value specified by the criterion.

18. The dropout detection method according to claim 16, wherein the criterion adjustment step changes the criterion such that the criterion specifies a smaller value for a smaller magnitude of the amplitude detected by the amplitude detection step, and
wherein the dropout signal generation step outputs the dropout detection signal during a time period in which the magnitude of a low-frequency component of the envelope signal is larger than the magnitude of a signal equal to the envelope signal plus a value specified by the criterion.

19. The dropout detection method according to claim 16, wherein the dropout signal generation step includes
an extraction step for extracting a low-frequency component of the envelope signal with the use of a low-pass filter, and
a comparison step for comparing the magnitude of a signal equal to the envelope signal plus a predetermined value and the magnitude of the low-frequency component extracted with the use of the low-pass filter, and outputting the dropout detection signal during a time period in which the magnitude of the low-frequency component is larger than the magnitude of the signal equal to the envelope signal plus the predetermined value,
wherein the criterion specifies a frequency gain characteristic of the low-pass filter, and
wherein the criterion adjustment step changes the criterion such that a cut-off frequency of the low-pass filter in the frequency gain characteristic specified by the criterion increases as the magnitude of the amplitude detected by the amplitude detection step decreases.

20. The dropout detection method according to claim 19, wherein the criterion specifies the magnitude of the predetermined value as well as the frequency gain characteristic of the low-pass filter, and
wherein the criterion adjustment step changes the criterion such that the magnitude of the predetermined value specified by the criterion decreases as the magnitude of the amplitude detected by the amplitude detection step decreases.

* * * * *